United States Patent Office 3,038,450
Patented June 12, 1962

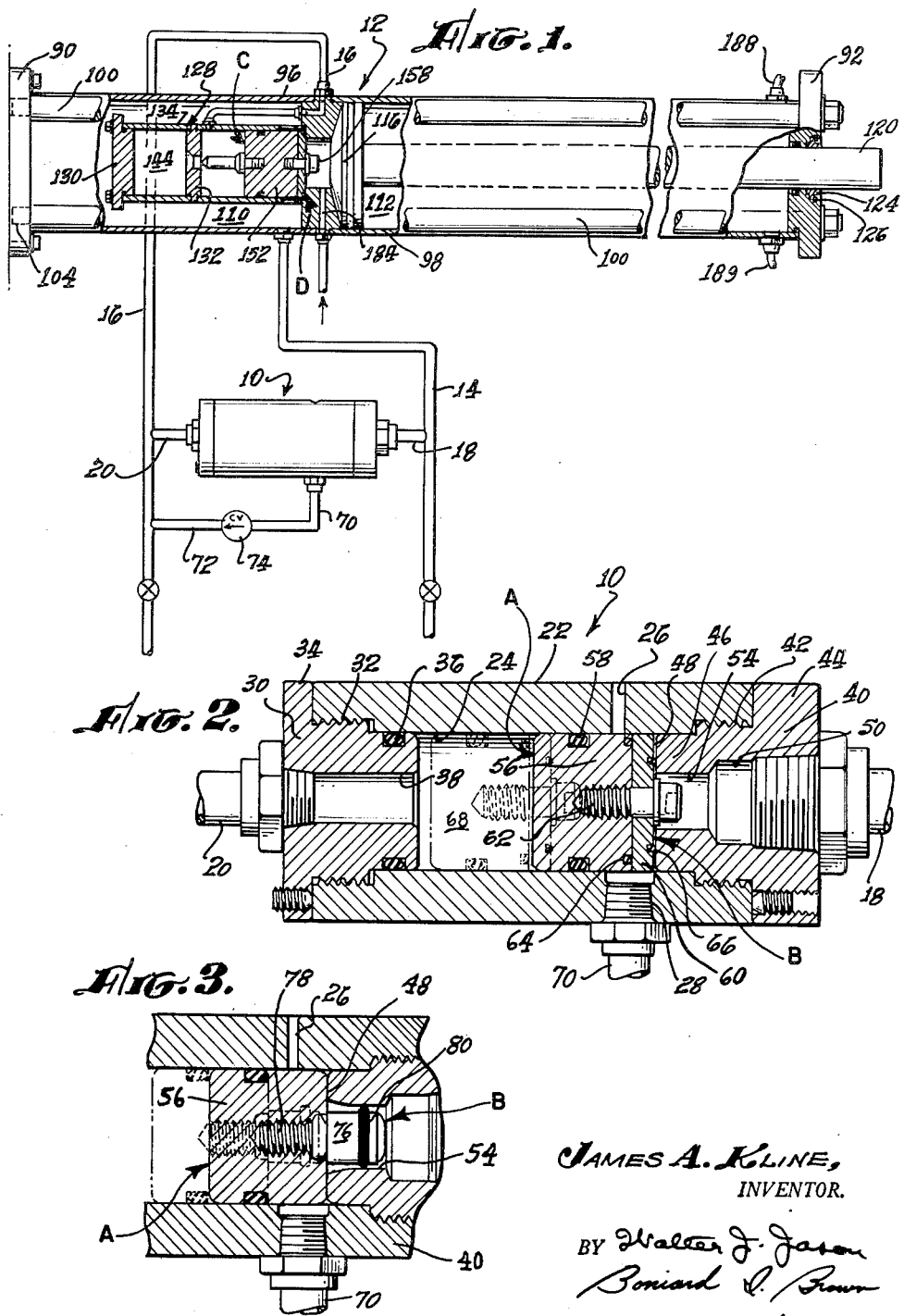

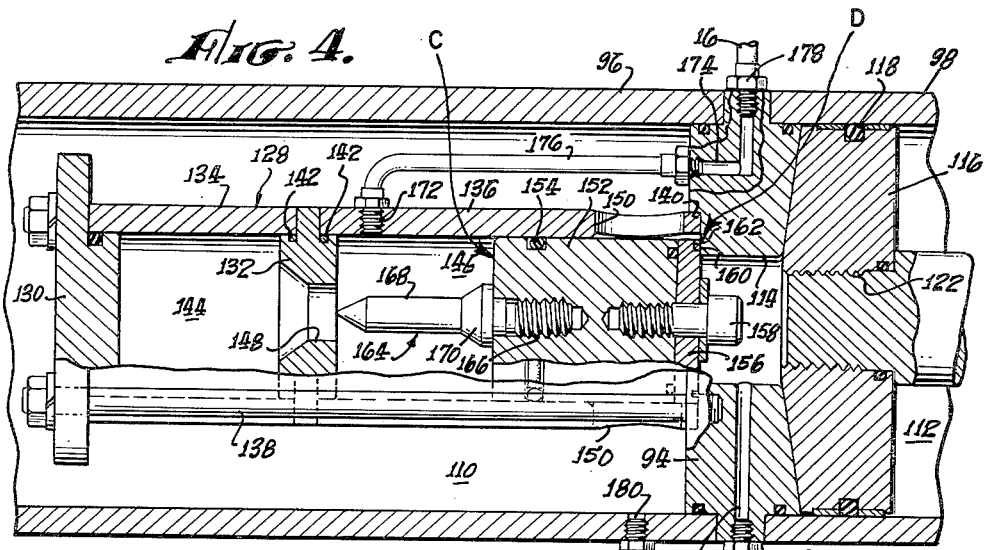
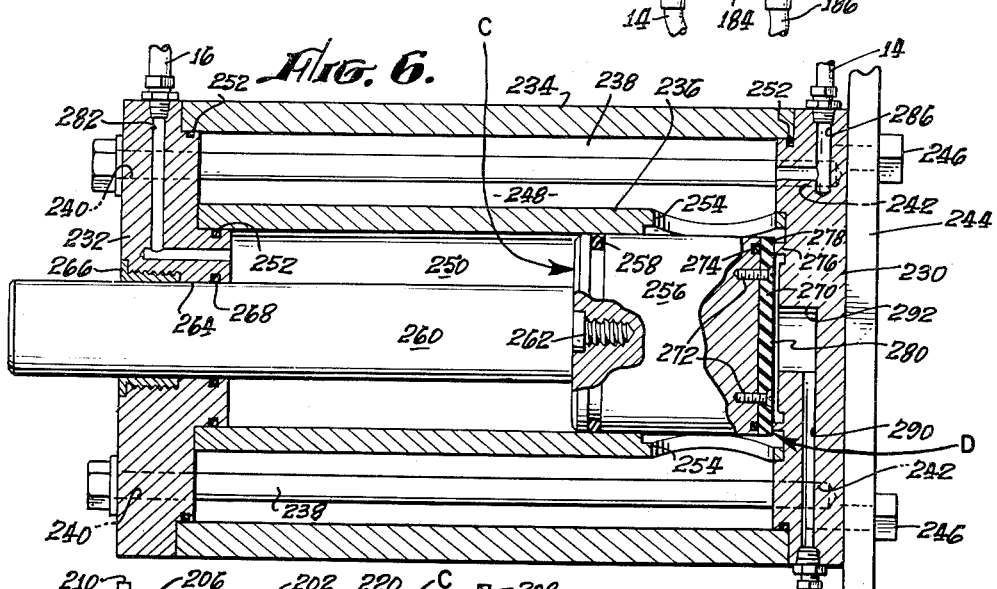
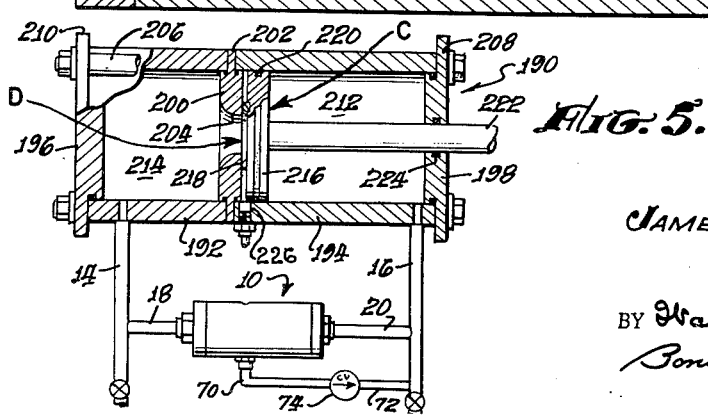

3,038,450
RATIO SAFETY VALVE
James A. Kline, San Diego, Calif., assignor to General Dynamics Corporation, San Diego, Calif., a corporation of Delaware
Filed Apr. 13, 1961, Ser. No. 102,691
12 Claims. (Cl. 121—38)

The present invention relates generally to safety valves for actuators; more particularly, the invention relates to a ratio safety valve for preventing accidental operation of an actuator by accidental change in the ratio between two operating pressures utilized by the actuator.

The ratio safety valve of the invention is adapted for utilization with pressure-operated actuators such as those shown and described in U.S. Patent No. 2,925,803, to Jack B. Ottestad, for "Actuating Pressure Release System," U.S. Patent No. 2,949,096 to Jack B. Ottestad and Samuel A. Skeen for "Pneumatic Actuator," in the copending application of Jack Benton Ottestad and Samuel Arthur Skeen, Serial No. 690,774, filed October 17, 1957, and now U.S. Patent No. 2,997,025, for "Externally Triggered Actuator," in the copending application of Josef K. Murek, Serial No. 18,303, filed March 29, 1960, and now U.S. Patent No. 2,986,120, for "Actuating Pressure Valve System," and in the copending application of Boniard I. Brown, Serial No. 38,844, filed June 27, 1960, for "High Energy Rate Actuator."

The present invention is utilized with embodiments of the actuators of the above-mentioned patents and applications wherein a separate triggering force is applied to overbalance opposing forces on a piston. In each of the actuators of this type, a piston is impelled to produce useful output upon the application thereto of a triggering force to unbalance the opposing forces on a piston, thereby disengaging a pressure seal between the piston and a wall to release an actuating pressure upon an area of the piston. The piston has opposite first and second pressure areas which bear a first ratio to each other. One of the opposing forces on the piston is a set force which is exerted by a set pressure upon the first pressure area. The opposite force is exerted by the actuating pressure on the second pressure area of the piston.

Such actuators inherently involve the disadvantage that a hazard is presented in that operation may be accidentally or spontaneously effected by a change in the ratio between the actuating and set pressures utilized by the actuator. Because actuator operation may be effected by the existence of a ratio between the actuating and set pressures which equals the ratio between the above-mentioned first and second pressure areas, spontaneous or accidental operation results when this pressure ratio occurs by an accidental increase in actuating pressure or decrease in set pressure. Such accidental operation obviously involves hazards to personnel and involves damage to property and/or equipment with which the actuator may be associated.

The present invention provides a ratio safety valve which serves to prevent accidental operation of the above-mentioned type by accidental increase of the ratio of the operating pressures to a spontaneous operating ratio.

The ratio safety valve operates at a lower pressure ratio than the pressure ratio which effects spontaneous actuator operation. Operation of the ratio safety valve releases or relieves the actuating pressure which would otherwise be applied to the actuator, thereby precluding accidental actuator operation. The ratio safety valve includes a wall member wherein an orifice is defined, and a relief piston which is cooperable with the wall member to provide a pressure seal about the orifice. The relief piston has opposite pressure areas to which the set pressure and the actuating pressure are respectively applied.

A relief port is defined in the safety valve adjacent to the relief piston. The actuator set pressure is applied to one of the pressure areas to exert a set force which urges the relief piston toward the wall member to effect the pressure seal, and the actuating pressure is applied to the other pressure area of the relief piston to oppose this set force. Upon the establishment of a certain ratio between the actuating and set pressures, which ratio is predetermined to be lower than the spontaneous operating ratio of the actuator, the relief piston is impelled from the wall member to uncover the relief port and relieve the actuating pressure. This prevents any increase of the ratio of actuating pressure to set pressure being applied to the actuator above the ratio between the pressure areas of the piston in the actuator. Accidental operation of the actuator by changes in input pressures is thus prevented.

The ratio safety valve operates at a lower pressure ratio than the actuator, and effects release or relief of the actuating pressure so that the actuating pressure cannot act upon the actuator to establish a spontaneous operating pressure ratio. In preferred embodiments of the ratio safety valve, the actuating pressure is released into a set pressure chamber in the actuator, and acts upon the piston in the actuator to exert additional force urging the piston against the wall. This provides an additional safety factor and increased assurance that accidental operation of the actuator cannot occur.

It is therefore an object of the present invention to provide a ratio safety valve for preventing accidental operation of an actuator by an accidental increase in the ratio between two operating pressures utilized in the actuator.

An object of the invention is the provision of a ratio safety valve for preventing accidental operation of an actuator by an accidental increase in the actuating pressure or by an accidental decrease in the set pressure utilized by the actuator.

It is an object of the invention to provide a ratio safety valve which operates to relieve the actuating pressure applied to an actuator upon the establishment of a certain ratio between the actuating and set pressures utilized in the actuator, which ratio is lower than the pressure ratio at which spontaneous operation of the actuator would occur.

An object of this invention is to provide a ratio safety valve according to the foregoing objects which releases the actuating pressure into an actuator chamber to exert holding force on a piston in the actuator to assist in preventing accidental actuator operation.

It is an object of the present invention to provide a ratio safety valve which prevents the operative application of actuating pressure to an actuator when the ratio between the actuating and set pressures utilized in the actuator exceeds a predetermined ratio, thereby preventing accidental operation of the actuator.

Other objects, features and advantages of the present invention will become apparent to those versed in the art from a consideration of the following description, the appended claims and the accompanying drawings, wherein:

FIGURE 1 is an elevational view, partially in section, showing a ratio safety valve of the present invention operatively connected with an actuator;

FIGURE 2 is an enlarged sectional view of the ratio safety valve shown in FIGURE 1;

FIGURE 3 is an enlarged fragmentary sectional view of a modified form of the ratio safety valve of FIGURE 2;

FIGURE 4 is an enlarged partial sectional view of the actuator of FIGURE 1;

FIGURE 5 is an elevational view, partially in section, showing the ratio safety valve of the invention operatively connected with another type of actuator; and FIGURE 6 is an elevational sectional view, showing details of another type of actuator, with which the ratio safety valve of the invention may be utilized.

Referring to the drawings, and particularly to FIGURES 1 and 2, a preferred embodiment of the ratio safety valve 10 of the present invention is shown operatively connected with an actuator 12. Both the safety valve and the actuator are connected with a source of actuating pressure (not shown) by a fluid coupling 14 and both are connected with a source of set pressure (not shown) by a fluid coupling 16. The safety valve communicates with coupling 14 through a connection 18 and with coupling 14 through a connection 20. In effect, the couplings connect the actuator with sources of actuating pressure and set pressure, and the safety valve is connected between the couplings.

As shown in FIGURE 2, the ratio safety valve 10 includes a cylindrical housing member 22 wherein are defined a large axial bore 24, a relatively small relief port 26, and a relatively large relief port 28. An end member 30 has its reduced threaded portion 32 secured within the end portion of cylindrical housing member 22, and a flange portion 34 of the end member abuts the end of the housing member. Pressure sealing between the housing member and the end member is provided by a sealing ring 36 in a peripheral groove in the end member. An axial bore 38 in the end member communicates with the fluid connection 20.

An orifice wall member 40 has a reduced portion threadedly secured in an enlarged portion 42 of the axial opening 24 at the end of the housing opposite from the end member 30. A flange portion 44 of the orifice wall member abuts the end of the housing member 22. A reduced portion 46 of the wall member fits within the bore 24 and has an annular wall surface 48. The orifice wall member has an enlarged axial opening 50, a portion of which is threaded to accommodate a fitting 52 for the coupling 18. An orifice 54 in the orifice member communicates between opening 50 and bore 24 for a purpose which is hereinafter described.

A relief piston 56 is slidable in the bore 24. Pressure sealing is provided by an annular seal 58 in a peripheral groove in the piston. A seal plate 60 is secured to the piston 56 by an axially positioned bolt 62. Pressure sealing between the plate and the piston is provided by a sealing ring 64 therebetween in an appropriate groove in the piston. An annular resilient sealing element 66 is disposed in an appropriate circular groove in the seal plate and is engageable with the wall surface 48 of the orifice wall member 40 to provide pressure sealing therebetween when the piston is urged toward the wall. The cylindrical housing member 22, the end member 30 and the piston 56 cooperate to define a set pressure chamber 68. Fluid couplings 70, 72 connect a check valve 74 between port 28 and fluid coupling 16.

FIGURE 3 illustrates a modified form of the ratio safety valve which is generally similar to the ratio safety valve of FIGURE 2, but which differs therefrom in that a different sealing arrangement is utilized between the piston and the orifice wall member 40. A cylindrical pin 76 is secured to the piston by engagement of its reduced threaded portion 78 in an axial opening. The pin is thus axially positioned and fits within the orifice 54, as shown. An annular resilient sealing element 80 is bonded in a peripheral groove in the pin to provide pressure sealing between the orifice wall and the piston, as shown. Like the safety valve of FIGURE 2, the valve of FIGURE 3 has an annular wall surface 48 of the wall member confronting the piston.

The set pressure acts through coupling 16 and the set pressure chamber 68 upon a relief piston area A, which is the effective cross-sectional area of the piston defined within the seal 58. The actuating pressure acts through the coupling 14 upon a relief piston area B which is defined within the annular sealing element 66. As will become clear from further description herein, the action of these pressures on the areas A and B constitutes a very important feature of the invention.

Referring to FIGURES 1 and 4, the actuator 12 is of the type shown and described in the above-mentioned U.S. Patent No. 2,925,803. The actuator includes a base member 90, an end member 92, an orifice plate or wall 94, and cylindrical sections 96 and 98, which are secured in clamped relation by tie-bolts 100. The tie-bolts extend through appropriately arranged openings in a flange portion of the end member and engage threaded openings 104 in the base member 90. The actuator assembly is secured to a wall or foundation by bolts 108 which extend through openings in a flange portion of the circular base member 90. Pressure sealing for the actuator housing is provided by resilient seal rings in appropriate grooves in the orifice plate or wall 94, in the base member and in the end member. The cylindrical actuator housing may be considered as divided into pressure chambers 110 and 112 by the orifice wall. An orifice 114 in the orifice plate interconnects these chambers for a purpose which is hereinafter explained.

An actuator piston 116 is positioned in chamber 112 and is adapted to seat against the orifice plate, as shown in FIGURE 4. An annular sealing element 118 in a peripheral groove in the piston provides pressure sealing between the actuator piston and cylindrical section 98. Bearing rings are disposed in recesses on either side of the sealing element to reduce sliding friction and to maintain alignment between the piston and the cylindrical section. A reduced end portion of a thrust column 120 is secured in a threaded axial opening 122 in the actuator piston. As shown in FIGURE 1, the thrust column extends through an axial opening in end member 92 and is slidably received in a bearing 124 which is disposed within an enlarged portion of the opening and retained by a locking ring 126. A resilient annular sealing element in a groove within the opening provides pressure sealing.

A release system assembly 128 is secured to the orifice plate, as shown in FIGURES 1 and 2. A cap member 130, an apertured wall member 132, and cylindrical sections 134, 136 are secured in clamped relation with the orifice plate 94 by tie-bolts 138. The end portion of cylindrical section 136 abuts a circular recessed surface 140 which extends about the orifice 114. Resilient seal rings 142 in appropriate grooves in the apertured wall member and in the cap member provide pressure sealing between these members and the cylindrical sections. The cylindrical sections and the cap member 130 form a casing which is divided into pressure chambers 144 and 146 by wall member 132. An aperture 148 is provided in the wall member 132 between the chambers, and circular ports 150 are provided in cylindrical section 136 near the orifice plate, for purposes hereinafter discussed.

A release piston 152 is slidably positioned in chamber 146 and confronts the orifice plate. An annular sealing element 154 in an appropriate peripheral groove in the piston provides pressure sealing between the piston and cylindrical section 136. A circular seal base 156 is secured by a bolt 158 to the piston and is provided with a groove in which a circular resilient pressure sealing element 160 is secured as by bonding. Pressure sealing between the valve piston and the seal base is provided by an appropriate seal ring. As shown, circular seal 160 encircles orifice 114 and effects a pressure seal between the piston and the orifice plate when the valve piston is seated against the orifice plate. As indicated in FIGURE 3, an annular area 162 of the piston or seal base is disposed outside this circular pressure seal which is thus effected. A deceleration metering pin 164 extends from the side of the piston opposite from the seal base, and is secured by engagement of its threaded shank portion 166 in an axial opening in the piston. The metering member has an elongated section 168 and an enlarged section 170 adapted to cooperate with aperture 148.

A port 172 in the release system casing, a passage 174 in the orifice plate and fluid couplings 176, 16 interconnect a source of set pressure (not shown) with chamber 146 in the release system assembly. Chamber 110 of the actuator communicates with a source of actuating pressure (not shown) through a port 180 and the fluid coupling 14. Tube 186 and radial passage 184 in the orifice plate interconnect orifice 114 and another source of pressure (not shown). A fluid coupling 188 (FIGURE 1) provides means for introducing pressure from another source (not shown) into chamber 112 of the actuator. A similar coupling 189 communicates with chamber 112 for a purpose which is hereinafter explained.

In the operation of the actuator 12, a set pressure is first introduced into chambers 146 and 144 through opening 172, fluid coupling 176 and passage 174. The set pressure acts upon the cross-sectional area of release piston 152 defined within sealing element 154, this area being designated by the letter C. Acting on area C, the set pressure exerts a set force which urges the piston against orifice plate 94, thereby compressing resilient seal 160 against the recessed surface 140 of the orifice plate and effecting a positive pressure seal about the orifice 114. A high actuating pressure is established in chamber 110 through port 180 and coupling 14. This pressure is exerted through ports 150 upon the annular piston area 156 outside resilient seal 160, this area being designated by the letter D. The actuating pressure force opposes the set force.

A triggering pressure is introduced through coupling 186 and passage 184 upon the release piston area within circular sealing element 160 to apply a triggering force. This force, cooperating with the actuating pressure acting on the piston area D unbalances the forces on the piston and disengages the sealing element 160. Upon elimination of the pressure seal, the high actuating pressure is released substantially instantaneously upon the piston area within sealing element 160. The release piston is thereby impelled with extremely high acceleration from the orifice plate or wall 94, as indicated in FIGURE 4. This releases the high actuating pressure substantially instantaneously through the orifice to act upon the actuator piston 116. The actuating pressure is thus suddenly applied to the entire area of the actuator piston confronting the orifice plate, as defined by peripheral sealing element 118, on which no substantial pressure had been acting. A great force is thus applied to the actuator piston to impel it from the orifice wall to produce high level actuator output.

After the release piston has been accelerated from the orifice wall, deceleration metering pin 164 coacts with the aperture 148 of wall member 132 to effect predetermined deceleration of the release piston in the manner described in the copending applications. The release piston forces the gas in chamber 146 through the deceleration aperture. The net aperture flow area is varied according to piston position by the longitudinal contour of the deceleration pin to produce predetermined variation in back pressure, in a manner known in the art. It will be understood that by using an appropriately contoured pin, a desired deceleration-time pattern may be obtained.

As described hereinbefore, the set pressure acts on piston pressure area C, the actuating pressure acts on pressure area D, and actuator operation is initiated by the application of a triggering force which, combined with the actuating pressure force on area D, overbalances the set force on area C.

It will be understood from the geometric relations of the parts that operation may be effected by the establishment of a ratio of actuating pressure to set pressure which equals or exceeds the ratio of area C to area D, this ratio being the spontaneous operating ratio of the actuator. The spontaneous operating ratio may be established by an accidental increase in actuating pressure or decrease in set pressure. The piston is urged from the wall to disengage the pressure seal and impel the piston when the product of the actuating pressure and area D equals or exceeds the product of the set pressure and area C. Therefore, the spontaneous operating ratio of the actuator is $$\frac{\text{Actuating pressure}}{\text{Set pressure}} = \frac{\text{area C}}{\text{area D}}$$

To maintain the actuator 12 in a condition wherein operation may be initiated by a triggering force on the piston, the ratio of actuating pressure to set pressure is maintained below the spontaneous operating ratio. This maintains the actuator in a safe condition.

In the ratio safety valve, the geometric relations are such that the ratio of the above-described areas A and B, on which the set pressure and actuating pressure respectively act, is lower than the spontaneous operating ratio of the actuator, the ratio of area C to area D. The spontaneous operating ratio of the ratio safety valve is $$\frac{\text{Actuating pressure}}{\text{Set pressure}} = \frac{\text{area A}}{\text{area B}}$$

For example, the ratio between pressure areas A and B in the safety valve may be 4:1, while the ratio between the pressure areas C and D in the actuator may be 5:1. With these ratios, the actuating pressure must be four times the set pressure to effect operation of the safety valve, while the actuating pressure must be five times the set pressure to effect spontaneous actuator operation.

When the ratio safety valve is operated by the establishment of its spontaneous operating ratio, as by an accidental increase in actuating pressure or accidental decrease in set pressure, the actuating pressure force on area B overbalances the set pressure force on area A, thereby unseating the relief piston and disengaging the pressure seal to release the actuating pressure over the annular piston area outside the pressure seal. This impels the relief piston from the orifice wall and uncovers the relief ports 26 and 28. The actuating pressure is thus released through port 26 to the exterior atmosphere and through coupling 70 into the set pressure chamber 144 of the actuator. It is preferable that a major portion of the gas under actuating pressure be released into the set pressure chamber of the actuator to exert additional holding force against the piston to urge it against the wall, because this provides an additional safety factor which further insures against accidental actuator operation. Obviously, only a single relief port might be utilized to release the actuating pressure only to the atmosphere or only to the actuator set pressure chamber.

The check valve 74 in coupling 72 permits the actuating pressure to be released through couplings 76, 16 into set pressure chamber 144 of the actuator, while normally preventing application of the set pressure to the relief piston area radially outside the pressure seal. Such application of the set pressure to this relief piston area would obviously render the safety valve inoperative.

From the foregoing, it will be understood that the ratio safety valve operates spontaneously at a lower pressure ratio than the spontaneous operating ratio of the actuator, and releases or relieves the actuating pressure, thereby preventing accidental increase of the ratio of the operating pressures to the spontaneous actuator-operating ratio. Therefore, accidental increase in the actuating pressure or accidental decrease in the set pressure cannot effect spontaneous actuator operation. Safety to personnel is insured and damage to equipment and property is prevented.

FIGURE 5 illustrates an actuator of the type shown and described in above-mentioned copending application, Serial No. 690,774. The actuator 190 includes cylindrical sections 192, 194, a base plate 196, an end wall 198, and an orifice wall 200 which has a flange portion 204 and which defines an orifice 204, all of these parts being secured in clamped relation by a plurality of tie-bolts 206. The tie-bolts extend through appropriate openings in flange portions 208, 210 of end wall 190 and base plate 196, respectively and are secured by nuts, as shown.

The actuator 190 is separated into a set pressure chamber 212 and an actuating pressure chamber 214 by the orifice wall 200. The coupling 14 connects chamber 214 with a source of actuating pressure (not shown) and coupling 16 connects chamber 212 with a source of set pressure (not shown). An actuator piston 216 is slidably positioned in the set pressure chamber 212. An annular resilient sealing element 218 is secured as by bonding in an appropriate circular groove in the piston in confronting relation with the orifice wall, and is engageable with a wall to provide pressure sealing between the piston and the wall about the orifice when the piston is urged toward the wall. A sliding pressure seal is provided between the piston and the cylindrical section 194 by a peripheral sealing ring 220 on the piston. A thrust column 222 is secured to the piston and extends through an axial opening in end wall 190. Pressure sealing about the thrust column is provided by a sealing ring 224 in a groove about the thrust column. A port 226 adjacent to the orifice wall 200 communicates with a source of triggering pressure (not shown).

The actuator of FIGURE 5 is prepared for operation by establishing a set pressure in chamber 212 through the coupling 16 and establishing an actuating pressure in the chamber 214 through the coupling 14. The set pressure acts on the pressure area C of the piston to exert a set force urging the piston toward the wall to establish a pressure seal about the orifice by means of the resilient sealing element 218. The actuating pressure acts on the pressure area D within the pressure seal to exert an opposing force. Actuator operation is initiated by the introduction through port 226 of a triggering pressure, which acts on the annular piston area outside the pressure seal to exert a force which overbalances the set force. The pressure seal is thereby disengaged and the piston is impelled from the orifice wall to produce output thrust.

Like the actuator of FIGURE 1, the actuator of FIGURE 5 will operate spontaneously upon the establishment of its spontaneous operating pressure ratio, which is a ratio of actuating pressure to set pressure equal to the ratio of area C to area D.

As shown in FIGURE 5, the ratio safety valve 10 is connected to the actuator 190 in a manner analogous to the connection of the ratio safety valve to the actuator 12 of FIGURE 1. The ratio safety valve operates in association with the actuator of FIGURE 5 in the same manner as that hereinbefore described in relation to the system of FIGURE 1.

FIGURE 6 illustrates another type of actuator with which the ratio safety valve may be utilized, this being the type shown and described in copending application Serial No. 38,844, hereinbefore identified. The device includes a housing assembly formed by a wall member 230, an end member 232, an outer casing 234 and an inner cylinder 236, all of which are secured in clamped relation by tie-bolts 238. Each of the tie-bolts extends through an appropriate opening 240 in the end member 232 and is secured in a threaded opening 242 in the wall member 230. The assembly is secured to a mounting plate 244 by bolts 246 which extend through openings in the plate into threaded engagement with the wall member, as shown. The housing is separated into an outer actuating pressure chamber 248 and an inner coaxial set pressure chamber 250 by the inner cylinder 236. Pressure sealing is provided for the pressure chambers 248, 250 by resilient seal rings 252 disposed in appropriate grooves in the end member 232 and in wall member 230, the seal rings being in sealing engagement with the casing 234 and the cylinder 236, as shown. Four large circular ports 254 are provided in the cylinder 236 adjacent to the wall member 230 for a purpose hereinafter described.

An actuator piston 256 is slidable in the inner cylinder 236 and confronts the wall member 230. The piston is adapted to seat against the wall, as shown in FIGURE 6. An annular seal ring 258 in a peripheral groove in the piston provides pressure sealing between the cylinder 236 and the piston. A thrust column 260 is secured to the actuator piston by threaded engagement of its reduced end portion 262 in an opening in the piston. The thrust column extends through an axial opening 264 in end member 232 and is slidably received in a bearing 266 threadedly secured within an enlarged portion of the opening 264. A resilient ring 268 in an appropriate groove within the opening provides pressure sealing about the thrust column.

A circular resilient sealing element or sealing plate 270, preferably formed of Teflon or nylon, is secured by screws 272 to the piston in confronting relation with the wall member 230. An annular seal ring 274 provides pressure sealing between the sealing element and the piston. A circular sealing rim 276 is defined in the wall member 230. The sealing element 270 and the sealing rim 276 are adapted to effect a circular pressure seal between the piston and the wall member about a portion of the wall member, when the piston is urged into engagement with the rim 276. As indicated in FIGURE 6, an annular area 278 of the piston or of the sealing element 270 is disposed outside this circular pressure seal, and a circular piston area 280 is defined within the pressure seal.

A passage 282 in end member 232 and a fluid coupling 284 connect the set pressure chamber 250 with a source of set pressure (not shown). A passage 286 in wall member 230 and a fluid coupling 288 interconnect the actuating pressure chamber 248 and a source of actuating pressure (not shown). A radial passage 290, an axial opening 292 in the wall member and a fluid coupling 294 interconnect the set pressure chamber 250 and the piston area confronting the wall member with a source of triggering pressure (not shown).

To prepare the actuator of FIGURE 6 for operation, a set pressure is introduced into the set pressure chamber 250 through the coupling 284 and the passage 282. The set pressure acts upon the annular area C of actuator piston 256 defined within the seal ring 258 and about thrust column 260. A set force is thereby exerted which urges the piston against the wall member 230 and compresses the resilient sealing element 270 against the sealing rim 276 to effect a positive pressure seal about a portion of the wall member 230. A relatively high actuating pressure is established in the actuating pressure chamber 248 through the coupling 288 and the passage 286 in wall member 230. The actuating pressure in chamber 248 acts through the ports 254 on the annular piston area 278 radially outside the pressure seal, this area being designated by the letter D. The force of this pressure on the annular area 278 opposes the set force on the piston and may be predetermined to substantially balance the set force and hold the piston in equilibrium. The resilient sealing element 270 effects a positive pressure seal even while the forces on the piston are nearly balanced.

To operate the actuator, the set force is overbalanced. This is done by utilizing a separate triggering force to cooperate with the actuating pressure force on the piston area outside the pressure seal in overbalancing the set force. This triggering force may be applied mechanically to the thrust column. It is preferably applied by introducing a triggering pressure through the passage 290 and the opening 292 to the actuator piston area within the pressure seal at the sealing rim 276. This triggering pressure is predetermined to overbalance the set force by cooperating with the force of the actuating pressure on the piston area 278 outside the pressure seal. The overbalancing action unseats the actuator piston and the sealing element 270 is disengaged from the sealing rim 276. With the pressure seal thus eliminated, the high actuating pressure is released substantially instantaneously upon the area of the actuator piston within the pressure seal and confronting the wall member 230. The actuator piston is suddenly impelled with great force from the wall to produce high level actuator output.

The actuator shown in FIGURE 6 will operate accidentally or spontaneously upon the establishment of its spontaneous pressure ratio. As is the case with the actuator of FIGURES 1 and 5, the spontaneous operating ratio of the actuator of FIGURE 6 is a ratio of actuating pressure to set pressure which equals the ratio of pressure area C to pressure area D.

The ratio safety valve 10 (shown in FIGURES 1, 2 and 5), is connected with the actuator of FIGURE 6 in the same manner as it is connected to the actuators of FIGURES 1 and 5. The valve is connected between couplings 14 and 16. The operation of the ratio safety valve in conjunction with the actuator is the same as the operation hereinbefore described in relation to the actuators of FIGURES 1 and 4.

From the foregoing description those versed in the art will appreciate that the present invention achieves the objects and realizes the advantages hereinbefore mentioned.

Although specific embodiments of the present invention have been described and illustrated in detail, it is to be clearly understood that the same are by way of illustration and example only; it is to be understood that the invention is not limited thereto, as many variations will be readily apparent to those versed in the art and the invention is to be given its broadest possible interpretation within the terms of the appended claims.

The inventor claims:

1. A ratio safety valve for preventing accidental operation of an actuator of the type wherein a piston is impelled to produce useful output upon the application thereto of a triggering force to unbalance opposing forces on the piston to disengage a pressure seal between the piston and a wall to release an actuating pressure upon an area of the piston, wherein the piston has opposite first and second pressure areas bearing a first ratio to each other, wherein one of said opposing forces is a set force exerted by a set pressure on said first pressure area, and wherein the other of said opposing forces is exerted by said actuating pressure on said second pressure area; said ratio safety valve comprising wall means defining an orifice, a relief piston cooperable with the wall means to provide a pressure seal therebetween about the orifice, said relief piston having opposite third and fourth pressure areas bearing a second ratio to each other, means defining at least one relief port adjacent to the relief piston, means for applying said set pressure to the third pressure area to exert a set force urging the relief piston toward the wall means to effect said pressure seal, and means for applying said actuating pressure to the fourth pressure area to oppose the set force, whereby the relief piston is impelled from the wall means to relieve the actuating pressure through said relief port upon the establishment of said second ratio between the actuating and set pressures, thereby preventing increase of the ratio of actuating pressure to set pressure above said first ratio, whereby accidental operation of the actuator by changes in input pressures is prevented.

2. A ratio safety valve for preventing accidental operation of an actuator of the type wherein a piston is impelled to produce useful output upon the application thereto of a triggering force to unbalance opposing forces on the piston to disengage a pressure seal between the piston and a wall to release an actuating pressure upon an area of the piston, wherein the piston has opposite first and second pressure areas bearing a first ratio to each other, wherein one of said opposing forces is a set force exerted by a set pressure in a set pressure chamber upon said first pressure area, and wherein the other of said opposing forces is exerted by said actuating pressure on said second pressure area; said ratio safety valve comprising wall means defining an orifice, a relief piston cooperable with the wall means to provide a pressure seal therebetween about the orifice, said relief piston having opposite third and fourth pressure areas bearing a second ratio to each other, means defining a relief port positioned to be uncovered by movement of the relief piston from the wall means, said relief port communicating with said actuator set pressure chamber, means for applying said set pressure to the third pressure area to exert a set force urging the relief piston toward the wall means to effect said pressure seal, and means for applying said actuating pressure to the fourth pressure area to oppose the set force, whereby the relief piston is impelled from the wall means to uncover said relief port to release the actuating pressure into said actuator set pressure chamber upon the establishment of said second ratio between the actuating and set pressures, thereby preventing increase of the ratio of actuating pressure to set pressure above said first ratio and exerting additional force on said first pressure area to assist in preventing piston movement in the actuator, whereby accidental operation of the actuator by changes in input pressures is prevented.

3. A ratio safety valve for preventing accidental operation of an actuator of the type wherein a piston is impelled to produce useful output upon the application thereto of a triggering force to unbalance opposing forces on the piston to disengage a pressure seal between the piston and a wall to release an actuating pressure upon an area of the piston, wherein the piston has opposite first and second pressure areas bearing a first ratio to each other, wherein one of said opposing forces is a set force exerted by a set pressure in a set pressure chamber upon said first pressure area, and wherein the other of said opposing forces is exerted by said actuating pressure on said second pressure area; said ratio safety valve comprising wall means defining an orifice, a relief piston cooperable with the wall means to provide a pressure seal therebetween about the orifice, said relief piston having opposite third and fourth pressure areas bearing a second ratio to each other, means defining a relief port communicating with the exterior atmosphere and a relief port communicating with said actuator set pressure chamber, said relief ports being positioned to be uncovered by movement of the relief piston from the wall means, means for applying said set pressure to the third pressure area to exert a set force urging the relief piston toward the wall means to effect said pressure seal, and means for applying said actuating pressure to the fourth pressure area to oppose the set force, whereby the relief piston is impelled from the wall means to uncover said relief ports to relieve the actuating pressure to the exterior atmosphere and into said actuator set pressure chamber upon the establishment of said second ratio between the actuating and set pressures, thereby preventing increase of the ratio of actuating pressure to set pressure above said first ratio and exerting additional force on said first pressure area to assist in preventing piston movement in the actuator, whereby accidental operation of the actuator by changes in input pressures is prevented.

4. A ratio safety valve for preventing accidental operation of an actuator of the type wherein a piston is cooperable with a wall to effect a pressure seal therebetween about an area of the piston, wherein a set pressure exerts a set force on a first pressure area to urge the piston toward the wall to effect a pressure seal, wherein an actuating pressure acts oppositely on a second pressure area of the piston, said first and second pressure areas having a first ratio, and wherein a separate triggering force is applied to the piston to cooperate with the actuating pressure force to overbalance the set force to release the actuating pressure upon an increased area of the piston to impel the piston; said ratio safety valve comprising valve housing means, wall means defining an orifice, a relief piston cooperable with the wall means to provide a pressure seal therebetween about the orifice, said relief piston having opposite third and fourth pressure areas bearing a second ratio to each other, means defining a relief port adjacent to the relief piston and communicating with the exterior atmosphere, means for applying said set pressure to the third pressure area to exert a set force urging the relief piston toward the wall means to effect said pressure seal, and means for applying said actuating pressure through the orifice on the fourth pressure area within the pressure seal to oppose the set force, whereby the relief piston is impelled from the wall means to uncover said relief port to release the actuating pressure through the relief port to the atmosphere upon the establishment of said second ratio between the actuating and set pressures, thereby preventing increase of the ratio of actuating pressure to set pressure above said first ratio, whereby accidental operation of the actuator by changes in input pressures is prevented.

5. A ratio safety valve for preventing accidental operation of an actuator of the type wherein a piston is impelled to produce useful output upon the application thereto of a triggering force to unbalance opposing forces on the piston to disengage a pressure seal between the piston and a wall to release an actuating pressure upon an area of the piston, wherein the piston has opposite first and second pressure areas bearing a first ratio to each other, wherein one of said opposing forces is a set force exerted by a set pressure on said first pressure area, and wherein the other of said opposing forces is exerted by said actuating pressure on said second pressure area; said ratio safety valve comprising wall means defining an orifice, a relief piston having a pin portion for extension into the orifice, sealing means on said pin portion for cooperation with the wall means to provide a pressure seal between the piston and the wall about the orifice, said relief piston having opposite third and fourth pressure areas bearing a second ratio to each other, said fourth pressure area being defined within said sealing means on said piston pin portion, means defining at least one relief port adjacent to the relief piston, means for applying said set pressure to the third pressure area to exert a set force urging the relief piston toward the wall means to effect said pressure seal, and means for applying said actuating pressure to the fourth pressure area to oppose the set force, whereby the relief piston is impelled from the wall means to relieve the actuating pressure through said relief port upon the establishment of said second ratio between the actuating and set pressures, thereby preventing increase of the ratio of actuating pressure to set pressure above said first ratio, whereby accidental operation of the actuator by changes in input pressures is prevented.

6. A ratio safety valve for use with an actuator of the type wherein a piston is cooperable with a wall to effect a pressure seal therebetween about an area of the piston, wherein a set pressure in a first pressure chamber exerts a set force on a first pressure area to urge the piston toward the wall to effect the pressure seal, wherein an actuating pressure in a second pressure chamber acts oppositely on a second pressure area of the piston, said first and second areas having a first ratio, and wherein a separate triggering force is applied to the piston to cooperate with the actuating pressure force to overbalance the set force to release the actuating pressure upon an increased area of the piston to impel the piston; said ratio safety valve comprising wall means defining an orifice, a relief piston cooperable with the wall means to provide a pressure seal therebetween about the orifice, said relief piston having opposite third and fourth pressure areas bearing a second ratio to each other, means defining at least one relief port adjacent to the relief piston, coupling means communicating from a source of set pressure to said third pressure area and to said actuator first pressure chamber, thereby applying said set pressure to the third pressure area to exert a set force urging the relief piston toward the wall means to effect said pressure seal, and coupling means communicating from a source of actuating pressure to said second actuator pressure chamber and to said fourth pressure area to apply the actuating pressure to the fourth pressure area to oppose the set force, whereby the relief piston is impelled from the wall means to relieve the actuating pressure through said relief port upon the establishment of said second ratio between the actuating and set pressures, thereby preventing increase of the ratio of actuating pressure to set pressure above said first ratio, whereby accidental operation of the actuator by changes in input pressures is prevented.

7. A ratio safety valve for preventing accidental firing of an actuator of the type wherein a wall defines an orifice between first and second pressure chambers within housing means, wherein an actuator piston is positioned in the first chamber and a release system assembly is disposed in the second chamber, wherein a release piston in the release assembly is adapted to cooperate with the wall to provide a pressure seal about the orifice, said release piston having first and second pressure areas having a first ratio to each other, wherein first coupling means communicate between a source of set pressure and the first chamber to exert a set force on said first pressure area urging the release piston toward the wall to effect said pressure seal and second coupling means communicate between a source of actuating pressure and said second chamber to apply the actuating pressure to the second pressure area to oppose the set force, and wherein a triggering force is applied to the release piston to cooperate with said actuating pressure force to overbalance the set force and expose an increased piston area to the actuating pressure to impel the release piston from the wall to release the actuating pressure through the orifice upon said actuator piston; said ratio safety valve comprising wall means defining an orifice, a relief piston cooperable with the wall means to provide a pressure seal therebetween about the orifice, said relief piston having opposite third and fourth pressure areas bearing a second ratio to each other, means defining at least one relief port adjacent to the relief piston, said first coupling means communicating between said set pressure source and said third pressure area to apply the set pressure thereto to exert a set force urging the relief piston toward the wall means to effect said pressure seal, and said second coupling means communicating between said actuating pressure source and said fourth pressure area to apply the actuating pressure thereto to oppose the set force, whereby the relief piston is impelled from the wall means to relieve the actuating pressure through said relief port upon the establishment of said second ratio between the actuating and set pressures, thereby preventing increase of the ratio of actuating pressure to set pressure above said first ratio, whereby accidental operation of the actuator by changes in input pressures is prevented.

8. A ratio safety valve according to claim 7, and further including means communicating between said relief port and said first actuator pressure chamber, whereby the impelling of the relief piston from the wall means uncovers the relief port to release the actuating pressure into the first actuator pressure chamber to exert additional force on said first pressure area to urge the relief piston toward the wall to assist in preventing piston movement and actuator operation.

9. A ratio safety valve for preventing accidental firing of an actuator of the type wherein a wall defines an orifice and defines first and second pressure chambers within housing means, wherein an actuator piston in the first chamber is cooperable with said wall to provide a pressure seal therebetween about the orifice, said piston having opposite first and second pressure areas having a first ratio between them, wherein first coupling means communicate between a source of set pressure and said first pressure chamber to apply the set pressure to said first pressure area to urge the piston toward the wall to effect said pressure seal and second coupling means communicate between a source of actuating pressure and said second pressure chamber to apply the actuating pressure to the second pressure area to oppose the set force, and wherein a triggering force is applied to the piston to overbalance the set force and eliminate the pressure seal to expose an increased area of the piston to the actuating pressure; said ratio safety valve comprising wall means defining an orifice, a relief piston cooperable with the wall means to provide a pressure seal therebetween about the orifice, said relief piston having opposite third and fourth pressure areas bearing a second ratio to each other, means defining at least one relief port adjacent to the relief piston, said first coupling means communicating between said set pressure source and said third pressure area to apply the set pressure thereto to exert a set force urging the relief piston toward the wall means to effect said pressure seal, and said second coupling means communicating between said actuating pressure source and said fourth pressure area to apply the actuating pressure thereto to oppose the set force, whereby the relief piston is impelled from the wall means to relieve the actuating pressure through said relief port upon the establishment of said second ratio between the actuating and set pressures, thereby preventing increase of the ratio of actuating pressure to set pressure above said first ratio, whereby accidental operation of the actuator by changes in input pressures is prevented.

10. A ratio safety valve according to claim 9, and further including means communicating between said relief port and said first actuator pressure chamber, whereby the impelling of the relief piston from the wall means uncovers the relief port to release the actuating pressure into the first actuator pressure chamber to exert additional force on said first pressure area to urge the relief piston toward the wall to assist in preventing piston movement and actuator operation.

11. A ratio safety valve for preventing accidental operation of an actuator of the type wherein housing means define an inner first pressure chamber and a coaxial second pressure chamber, wherein an actuator piston in the first chamber confronts a wall and is adapted for cooperation with the wall to provide a pressure seal therebetween about a portion of the wall, said actuator piston having first and second pressure areas having a first ratio between them, wherein first coupling means communicate between a set pressure source and the first pressure chamber to apply the set pressure to said first pressure area to urge the piston toward the wall to effect the pressure seal and second coupling means communicate between a source of actuating pressure and said second pressure chamber to apply the actuating pressure to the second pressure area to oppose the set force, and wherein a triggering force is applied to the actuator piston to cooperate with the second force to overbalance the set force and eliminate the pressure seal to expose an increased piston area to the actuating pressure; said ratio safety valve comprising wall means defining an orifice, a relief piston cooperable with the wall means to provide a pressure seal therebetween about the orifice, said relief piston having opposite third and fourth pressure areas bearing a second ratio to each other, means defining at least one relief port adjacent to the relief piston, said first coupling means communicating between said set pressure source and said third pressure area to apply the set pressure thereto to exert a set force urging the relief piston toward the wall means to effect said pressure seal, and said second coupling means communicating between said actuating pressure source and said fourth pressure area to apply the actuating pressure thereto to oppose the set force, whereby the relief piston is impelled from the wall means to relieve the actuating pressure through said relief port upon the establishment of said second ratio between the actuating and set pressures, thereby preventing increase of the ratio of actuating pressure to set pressure above said first ratio, whereby accidental operation of the actuator by changes in input pressures is prevented.

12. A ratio safety valve according to claim 11, and further including means communicating between said relief port and said first actuator pressure chamber, whereby the impelling of the relief piston from the wall means uncovers the relief port to release the actuating pressure into the first actuator pressure chamber to exert additional force on said first pressure area to urge the relief piston toward the wall to assist in preventing piston movement and actuator operation.

No references cited.